(12) United States Patent
Klinghult et al.

(10) Patent No.: US 9,104,272 B2
(45) Date of Patent: Aug. 11, 2015

(54) FINGER-ON DISPLAY DETECTION

(75) Inventors: Gunnar Klinghult, Lund (SE); Aleksandar Rodzevski, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 117 days.

(21) Appl. No.: 13/823,171

(22) PCT Filed: May 11, 2011

(86) PCT No.: PCT/IB2011/052245
§ 371 (c)(1),
(2), (4) Date: Mar. 14, 2013

(87) PCT Pub. No.: WO2012/160414
PCT Pub. Date: Nov. 29, 2012

(65) Prior Publication Data
US 2013/0181951 A1    Jul. 18, 2013

(51) Int. Cl.
*G06F 3/043* (2006.01)
*G06F 3/041* (2006.01)

(52) U.S. Cl.
CPC .............. *G06F 3/043* (2013.01); *G06F 3/0416* (2013.01); *G06F 2203/04101* (2013.01); *G06F 2203/04106* (2013.01); *G06F 2203/04108* (2013.01)

(58) Field of Classification Search
CPC ....... G06F 3/041; G06F 3/0412; G06F 3/043; G06F 2230/04101; G06F 2203/04106; G06F 2203/04108
USPC ............... 345/156, 157, 173, 177; 178/18.01, 178/18.03, 18.04
See application file for complete search history.

(56) References Cited

U.S. PATENT DOCUMENTS

| 8,614,693 B2 * | 12/2013 | King et al. | 345/174 |
| 2005/0064936 A1 * | 3/2005 | Pryor | 463/36 |

(Continued)

FOREIGN PATENT DOCUMENTS

| EP | 2 323 023 A2 | 5/2011 |
| WO | 2006/133018 A2 | 12/2006 |

(Continued)

OTHER PUBLICATIONS

International preliminary report on patentability and Written Opinion of the International Searching Authority dated Dec. 5, 2013, issued in corresponding PCT application No. PCT/IB2011/052245, 8 pages.
International Search Report and Written Opinion dated Dec. 27, 2011 issued in corresponding PCT application No. PCT/IB2011/052245, 12 pages.

*Primary Examiner* — Ilana Spar
(74) *Attorney, Agent, or Firm* — Snyder, Clark, Lesch & Chung, LLP

(57) ABSTRACT

A user device comprising a touch display capable of operation in an on-touch mode or a touchless mode; one or more sensors to detect a sound wave produced when a user's finger or an instrument touches the touch display; one or more memories to store instructions; and one or more processing systems to execute the instructions and configure the one or more processing systems to: identify whether a detected sound wave includes characteristics indicative of when the user's finger or an instrument touches the touch display; and set a sensitivity mode of the touch display to a decreased level relative to an increased level associated with a touchless operation of the touch display.

20 Claims, 9 Drawing Sheets

(56) References Cited

U.S. PATENT DOCUMENTS

| | | | |
|---|---|---|---|
| 2008/0165022 A1* | 7/2008 | Herz et al. | 340/669 |
| 2009/0128515 A1* | 5/2009 | Bytheway | 345/174 |
| 2010/0302144 A1 | 12/2010 | Burtner et al. | |
| 2011/0032205 A1* | 2/2011 | David | 345/173 |
| 2011/0096036 A1* | 4/2011 | McIntosh et al. | 345/177 |
| 2013/0069916 A1* | 3/2013 | Esteve | 345/177 |

FOREIGN PATENT DOCUMENTS

| | | |
|---|---|---|
| WO | WO 2006133018 A2 * | 12/2006 |
| WO | 2008/007372 A2 | 1/2008 |
| WO | WO 2008007372 A2 * | 1/2008 |

* cited by examiner

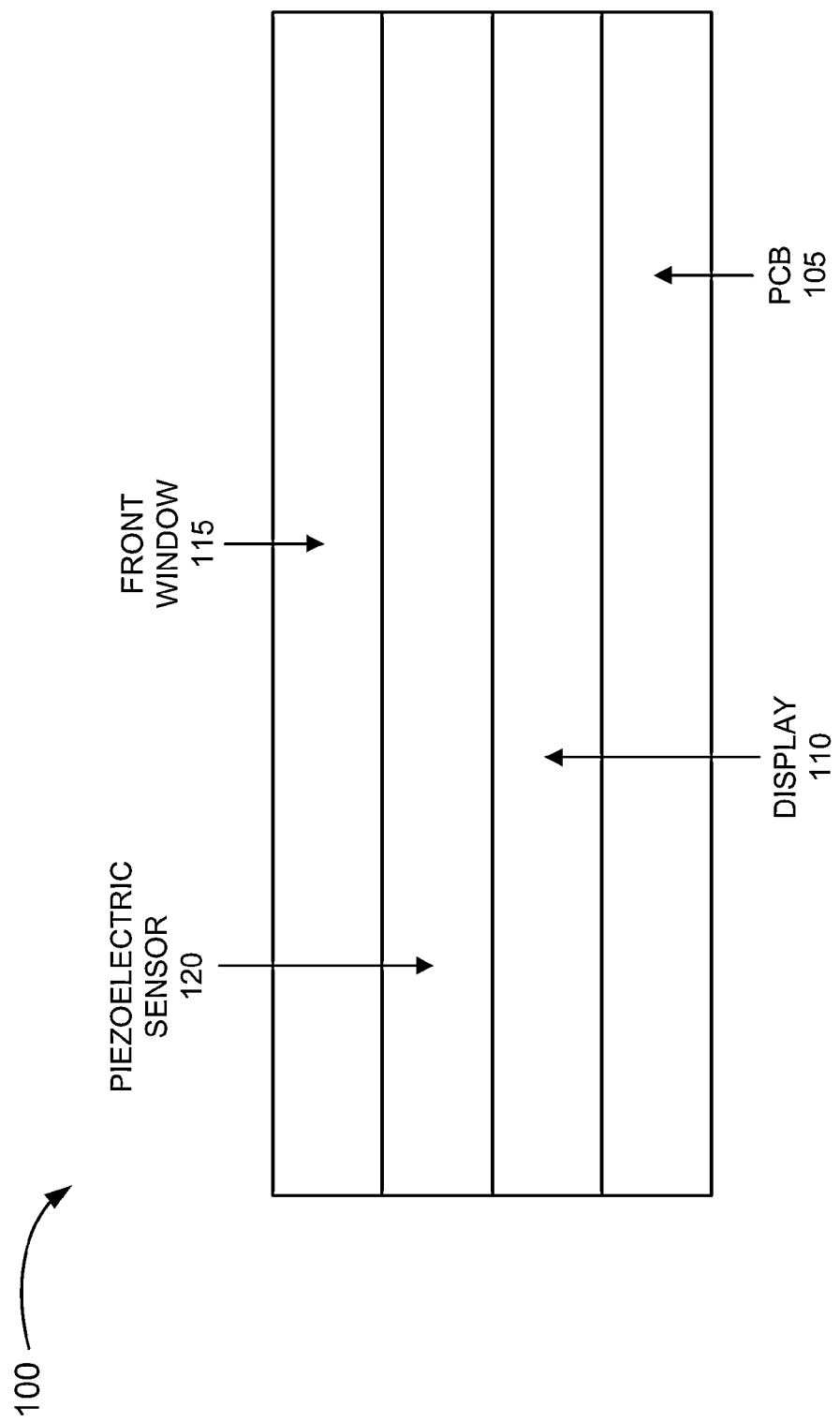

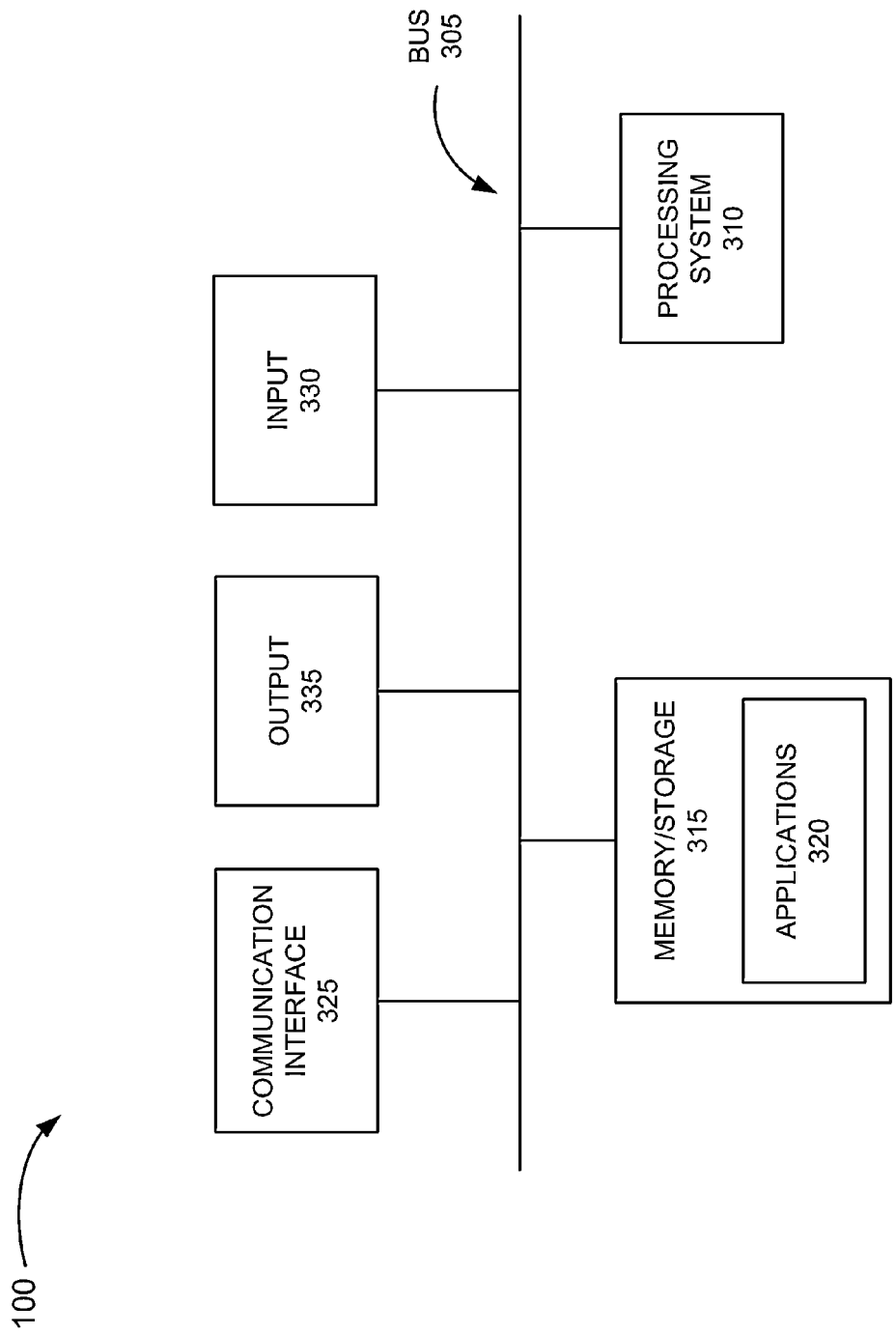

FINGER-ON DISPLAY DETECTION

BACKGROUND

User devices, such as mobile and handheld devices, include touch displays (also referred to as touch panels). Users may interact with the touch displays by using their fingers or other instruments (e.g., a stylus, etc.). Touch displays may also have air-touch and air-gesture capabilities in which the users may interact with the touch displays without physically touching the touch displays. One issue with providing touch displays that permit users to use both on-touch and air-touch/air gesture is signal-to-noise ratio. For example, one of the main noise sources stem from the touch display and its accompanied driver. Other issues with providing touch displays having both on-touch and air-touch/air gesture capabilities are finger-on and finger-off detections.

SUMMARY

According to one aspect, a user device may comprise a touch display capable of operation in an on-touch mode or a touchless mode and one or more sensors to detect a sound wave produced when a user's finger or an instrument touches the touch display. The user device may further comprise one or more memories to store instructions and one or more processing systems to execute the instructions and configure the one or more processing systems to identify whether a detected sound wave includes characteristics indicative of when the user's finger or an instrument touches the touch display; and set a sensitivity mode of the touch display to a decreased level relative to an increased level associated with touchless mode of the touch display.

Additionally, the one or more sensors may comprise at least one of a piezoelectric sensor, a microphone, or an accelerometer.

Additionally, the piezoelectric sensor may be located between layers of the touch display.

Additionally, the one or more sensors may comprise one or more microphones, and when identifying whether the detected sound wave includes characteristics indicative of when the user's finger or the instrument touches the touch display, the one or more processing systems may execute the instructions and configure the one or more processing systems to compare one or more signals output from the one or more microphones to a frequency signature representing when a user's finger or an instrument touches the touch display.

Additionally, the one or more sensors may comprise one or more piezoelectric sensors, and when identifying whether the detected sound wave includes characteristics indicative of when the user's finger or the instrument touches the touch display, the one or more processing systems may execute the instructions and configure the one or more processing systems to compare one or more signals output from the one or more piezoelectric sensors to a voltage signature representing when a user's finger or an instrument touches the touch display.

Additionally, the touch display may be a single-point input device.

Additionally, the user device may comprise a touch driver to detect when the user's finger or the instrument is released from the touch display, and wherein the one or more processing systems may execute the instructions and configure the one or more processing systems to set the sensitivity mode of the touch display to the increased level.

According to another aspect, a method may comprise detecting a sound wave; outputting a signal corresponding to the sound wave; determining whether the signal is indicative of a user's finger or an instrument touching a surface of a touch display; setting a sensitivity level of the touch display to a decreased level relative to an increased level associated with touchless operation of the touch display, when it is determined that the signal is indicative of the user's finger or an instrument touching the surface of the touch display; subsequently detecting a release of the user's finger or the instrument; and setting a sensitivity level of the touch display to the increased level.

Additionally, when determining, the method may comprise comparing the signal to a frequency and amplitude spectral signature over time representative of when a user's finger or an instrument touches the surface of the touch display; and determining whether a match exists based on the comparing.

Additionally, the method may comprise maintaining the increased level of sensitivity of the touch display when it is determined that the signal is not indicative of the user's finger or the instrument touching the surface of the touch display.

Additionally, the detecting may be based on one or more microphones or one or more accelerometers.

Additionally, the sound wave may be detected when it propagates via the touch display.

Additionally, the method may comprise receiving a request to launch an air-touch and air-gesture application or a user setting; and setting the sensitivity level of the touch display to the increased level based on the receiving.

Additionally, the detecting may be based on one or more piezoelectric sensors, and the outputting may comprise outputting a voltage signal corresponding to the sound wave.

Additionally, the method may comprise detecting a shadow located on the touch display; determining whether a shape of the shadow corresponds to the user's finger or the instrument; and providing a touchless input when it is determined that the shape of the shadow corresponds to the user's finger or the instrument.

According to yet another aspect, a computer-readable medium may store instructions, when executed by one or more processors, for receiving a signal; determining whether the signal is indicative of a user's finger or an instrument touching a surface of a touch display based on a detection of a sound wave; setting a sensitivity level of the touch display to a decreased level relative to an increased level associated with touchless operation of the touch display, when it is determined that the signal is indicative of the user's finger or an instrument touching the surface of the touch display; subsequently detecting a release of the user's finger or the instrument; and setting a sensitivity level of the touch display to the increased level or maintaining the decreased level.

Additionally, the computer-readable medium may further store instructions for comparing the signal to a frequency and amplitude spectral signature over time representative of when a user's finger or an instrument touches the surface of the touch display; and determining whether a match exists based on the comparing.

Additionally, the computer-readable medium may further store instructions for maintaining the setting level of the touch display when it is determined that the signal is not indicative of the user's finger or the instrument touching the surface of the touch display.

Additionally, the computer-readable medium may further store instructions for comparing the signal to a voltage signal signature representative of when a user's finger or an instrument touches the surface of the touch display; and determining whether a match exists based on the comparing.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings:

FIG. 1A is a diagram illustrating a cross-sectional view of an exemplary embodiment of a user device comprising a piezoelectric sensor capable of touch detection of a touch display;

FIG. 3 is a diagram illustrating exemplary components of a user device;

DETAILED DESCRIPTION

Figure 1B:
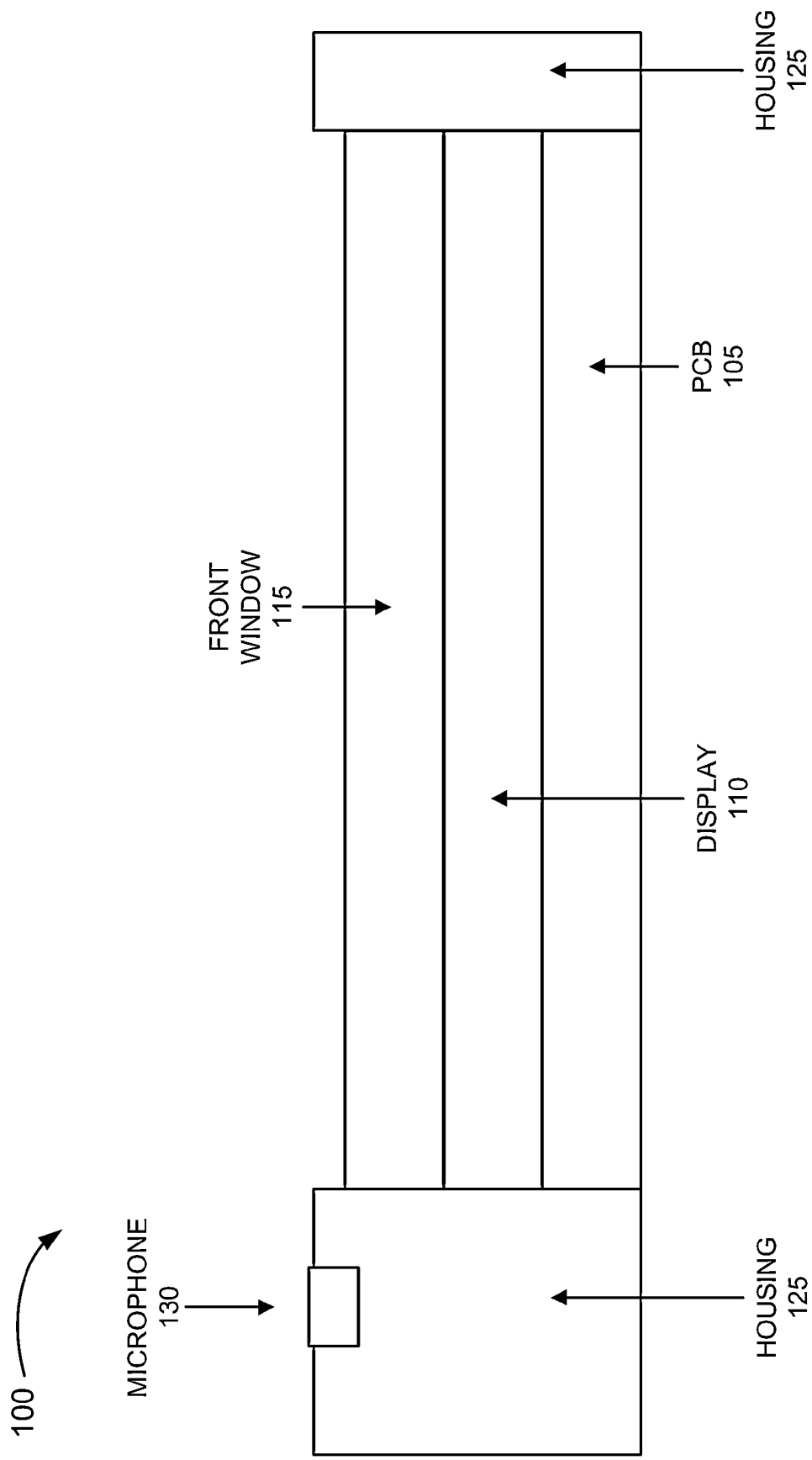
FIG. 1B is a diagram illustrating a cross-sectional view of another exemplary embodiment of a user device comprising a microphone capable of touch detection of a touch display.

The following detailed description refers to the accompanying drawings. The same reference numbers in different drawings may identify the same or similar elements. Also, the following description does not limit the invention. Rather, the scope of the invention is defined by the appended claims.

According to an exemplary embodiment, a user device comprises finger-on and finger-off detection capabilities in conjunction with two separate sensitivity modes for a touch driver associated with a touch display. According to an exemplary embodiment, the two sensitivity modes correspond to on-touch and air-touch/air-gesture (e.g., touchless) capabilities. According to an exemplary embodiment, the sensitivity mode pertaining to when the user is using his/her finger(s) or an instrument for touching the touch display is of a decreased sensitivity relative to another sensitivity mode pertaining to when the user's finger(s) or an instrument is/are off the touch display (i.e., air touch and air gesture). In this way, problems such as hovering (e.g., touching/dragging when the user's finger(s) or instrument is leaving the touch display) and unwanted touch detections may be avoided. That is, these problems may occur if the sensitivity mode of the touch driver is set to a maximum setting or increased sensitivity all the time (i.e., for both on-touch and air-touch/air-gesture). However, according to an exemplary embodiment, the finger-on and finger-off detection may cause the touch driver to be set in different sensitivity modes depending on the finger(s) state or instrument state.

According to an exemplary embodiment, the finger-on and finger-off detection capabilities may comprise one or more types of sensors that detect sound waves (e.g., that propagate in a medium, such as air and/or the user device) actuated when the user touches the touch display with his/her finger(s) or an instrument. For example, the user device may comprise one or multiple microphones, one or multiple piezoelectric sensors, and/or one or multiple accelerometers. According to an exemplary embodiment, the user device may comprise air-touch and/or air-gesture applications, which when launched, may be used to place the touch driver in an increased sensitivity mode. According to an exemplary embodiment, the user device may permit the user to configure the touch driver via a user setting for the increased sensitivity mode.

According to an exemplary embodiment, the user device comprises a finger state handler application (e.g., a daemon application) that manages the sensitivity mode of the touch driver based on finger-on and finger-off detections, air-touch and/or air-gesture application, and user settings, as well as other triggering events.

As a result of the foregoing, a user device may provide touch sensing features for a touch display that accommodates on-touch and air-touch/air-gesture capabilities based on separate finger on/off detections, as well as other advantages that naturally flow therefrom. For example, a user device typically includes a microphone and/or an accelerometer so that additional hardware may not be needed and cost issues may be minimized. Additionally, user device resources for addressing fault handlings may be minimized. Additionally, the sensor(s) may act as another detector (i.e., in addition to touch sensors (e.g., capacitive sensing, etc.)) to minimize false positives and/or cope with signals generated when a user's finger or an instrument is close to or near the touch display. Additionally, the sensor(s) and/or processing logic may be configured to have particular thresholds and/or signal signatures to determine whether a user's finger(s) or an instrument is touching the touch display or not.

Figure 1C:
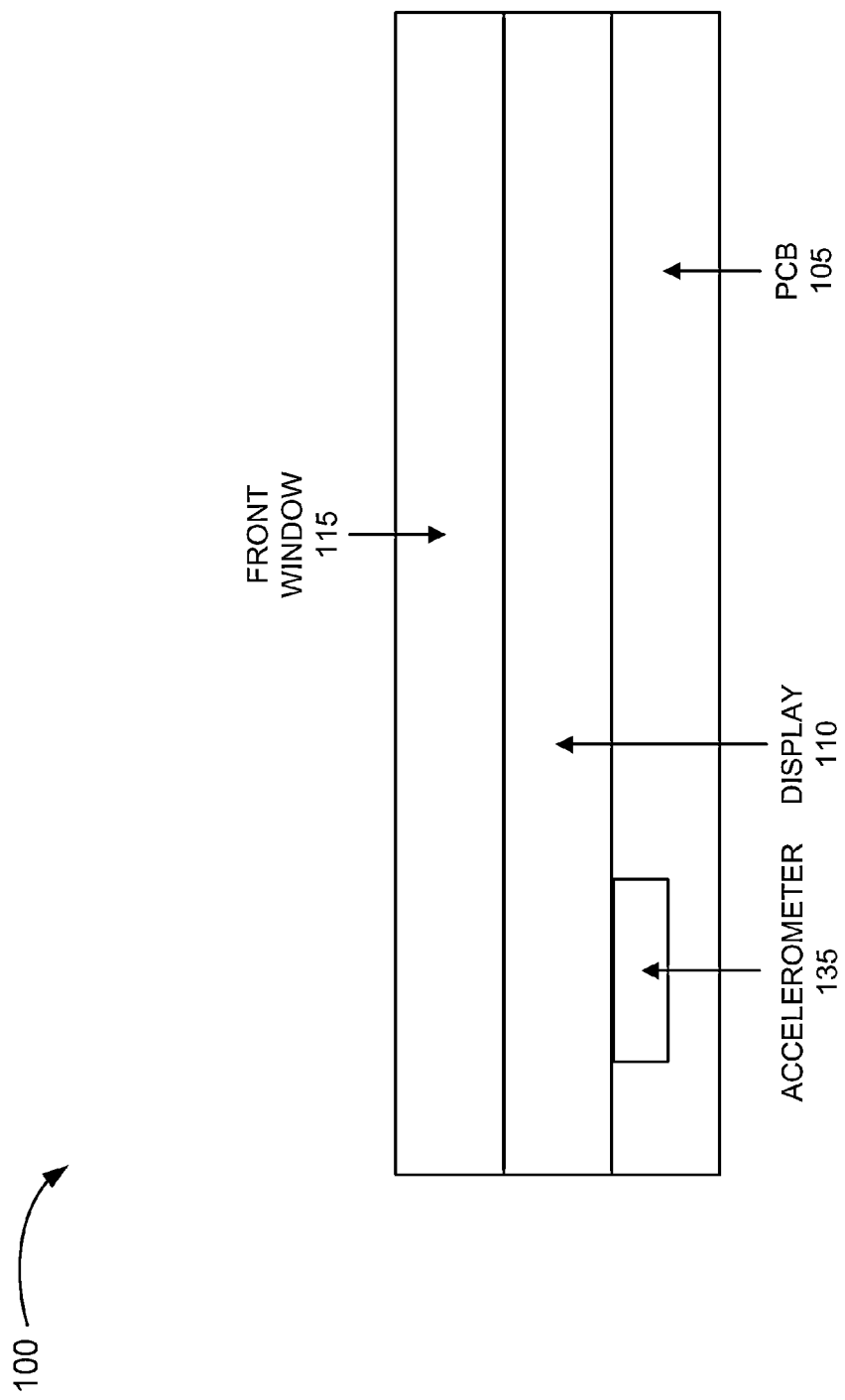
FIG. 1C is a diagram illustrating a cross-sectional view of another exemplary embodiment of a user device comprising an accelerometer capable of touch detection of a touch display.

FIGS. 1A-1C are diagrams illustrating exemplary embodiments of a user device comprising sensors to detect touches of a touch display. FIG. 1A is a diagram illustrating a cross-sectional view of an exemplary embodiment of a user device 100 comprising a piezoelectric sensor. As illustrated, user device 100 may comprise a printed circuit board (PCB) 105, a display 110, a front window 115, and a piezoelectric sensor 120.

PCB 105 may comprise hardware components (e.g., processing system, memory, etc.) and software components to provide various functions pertaining to user device 100. Display 110 comprises a touch-sensitive screen. Display 110 may be a single-point input device (e.g., capable of sensing a single touch) or a multipoint input device (e.g., capable of sensing multiple touches that occur at the same time). Display 110 may also have touchless capabilities (e.g., air touch, air-gesture). Display 110 may be implemented using a variety of sensing technologies, such as, for example, capacitive sensing, surface acoustic wave sensing, resistive sensing, optical sensing, pressure sensing, infrared sensing, gesture sensing, etc. Display 110 may take the form of a liquid crystal display (LCD), a plasma display panel (PDP), a field emission display (FED) a thin film transistor (TFT) display, or some other type of display technology. Front window 115 may comprise a piece of glass or other type of (protective) covering, layer, or film (e.g., plastic, etc.) for display 110.

Piezoelectric sensor 120 may comprise of a piezoelectric ceramic, plastic (e.g., polyvinylidene fluoride (PVDF), etc.), polymer, compound (e.g., aluminum nitride, etc.), or other suitable material. According to an exemplary implementation, as illustrated in FIG. 1A, piezoelectric sensor 120 may be located under front window 115. By way of example, a PVDF strip coated with a transparent conducting layer(s) may be located under front window 115 since the PVDF strip may be transparent and thin (e.g., below 0.1 mm). The sensitivity of PVDF is relatively high, so the dimensions of the PVDF strip may be small (e.g., 5-10 mm$^2$). According to an implementation, an amplifier may be used to boost the signal produced by piezoelectric sensor 120. Additionally, or alternatively, other logic may be needed to read and filter values associated with the signals produced. By way of example, the logic may comprise a comparator. The comparator may identify whether a voltage reaches a particular voltage level or threshold. Alternatively, the comparator may match a voltage signal with one or more voltage signal signatures corresponding to the responsive nature of piezoelectric sensor 120 when a user touches front window 115 with a finger(s) or an instrument.

The number and location of piezoelectric sensor 120, as illustrated in FIG. 1A, is exemplary. According to other implementations, the number and/or location of piezoelectric sensor 120 may be different. By way of example, according to an exemplary embodiment, piezoelectric sensor 120 may be located within display 110 (e.g., layers thereof) and/or between display 110 and PCB 105. Additionally, user device 100 may comprise multiple piezoelectric sensors 120. Piezoelectric sensor 120 is described further below.

FIG. 1B is a diagram illustrating a cross-sectional view of an exemplary embodiment of a user device 100 comprising a microphone. As illustrated, user device 100 may comprise printed circuit board 105, display 110, front window 115, a housing 125, and a microphone 130. PCB 105, display 110, and front window 115 may be similar to that described above. Housing 125 may comprise a structure to contain components of user device 100. For example, housing 125 may be formed from plastic, metal, or some other type of material. Housing 125 may structurally support microphone 130 and other components of user device 100 (e.g., PCB 105, display 110, front window 115, etc.).

Microphone 130 comprises a microphone having a frequency response receptive to a sound produced by a user's finger(s) or an instrument touching front window 115. For example, the sound produced by a user's finger(s) or an instrument may produce a sound having particular frequency signature(s) (e.g., fundamentals, harmonics, inharmonics, frequency distributions, amplitudes, etc.).

According to an exemplary implementation, microphone 130 may also be used by a user during a telephone call, to execute a voice command, etc. Alternatively, according to an exemplary implementation, microphone 130 may be a dedicated microphone for detecting the sound waves produced by a user's finger(s) or an instrument.

The number and location of microphone 130, as illustrated in FIG. 1B, is exemplary. According to an exemplary embodiment, as illustrated in FIG. 1B, microphone 130 is located within housing 125. By way of example, microphone 130 may be located in one or more locations proximate to a perimeter of front window 115 (e.g., within housing 125). According to such an implementation, microphone 130 may be in a location that does not permit a user to speak into microphone 130. According to another implementation, when microphone 130 is configured for a user to speak into, etc., microphone 130 may be at a location more distant from front window 115. Additionally, depending on the configuration of user device 100 (e.g., a clamshell configuration, a slider configuration, a candy bar configuration, a swivel configuration, etc.), microphone 130 will be positioned in a user-friendly location to allow a user to speak into microphone 130. Therefore, the possible locations of microphone 130 are not exhaustively described. Additionally, according to other implementations, user device 100 may comprise multiple microphones 130. Microphone 130 is described further below.

FIG. 1C is a diagram illustrating a cross-sectional view of an exemplary embodiment of a user device 100 comprising an accelerometer. As illustrated, user device 100 may comprise printed circuit board 105, display 110, front window 115, and an accelerometer 135. PCB 105, display 110, and front window 115 may be similar to that described above.

Accelerometer 135 may comprise a low impedance output accelerometer. For example, accelerometer 135 may take the form of a Micro-Electro-Mechanical Systems (MEMS) sensor or some other form of an accelerometer. Accelerometer 135 may detect the vibration or acceleration of motion associated with a sound wave produced by the user's finger(s) or an instrument touching front window 115. By way of example, a 3D accelerometer may be used and logic may sum the signals (e.g., the three axis transients) and calculate a root means square (RMS) value, which may be used to filter out (small) deviations. Accelerometer 135 may also detect movement and/or orientation of user device 100, as typically provided by accelerometers included in user devices.

The number and location of accelerometer 135, as illustrated in FIG. 1C, is exemplary. According to an exemplary embodiment, as illustrated in FIG. 1C, accelerometer 135 is located on printed circuit board 105, which may be proximate to display 110 (e.g., underneath or elsewhere). According to other implementations, user device 100 may comprise multiple accelerometers 135. Accelerometer 135 is described further below.

Figure 2:
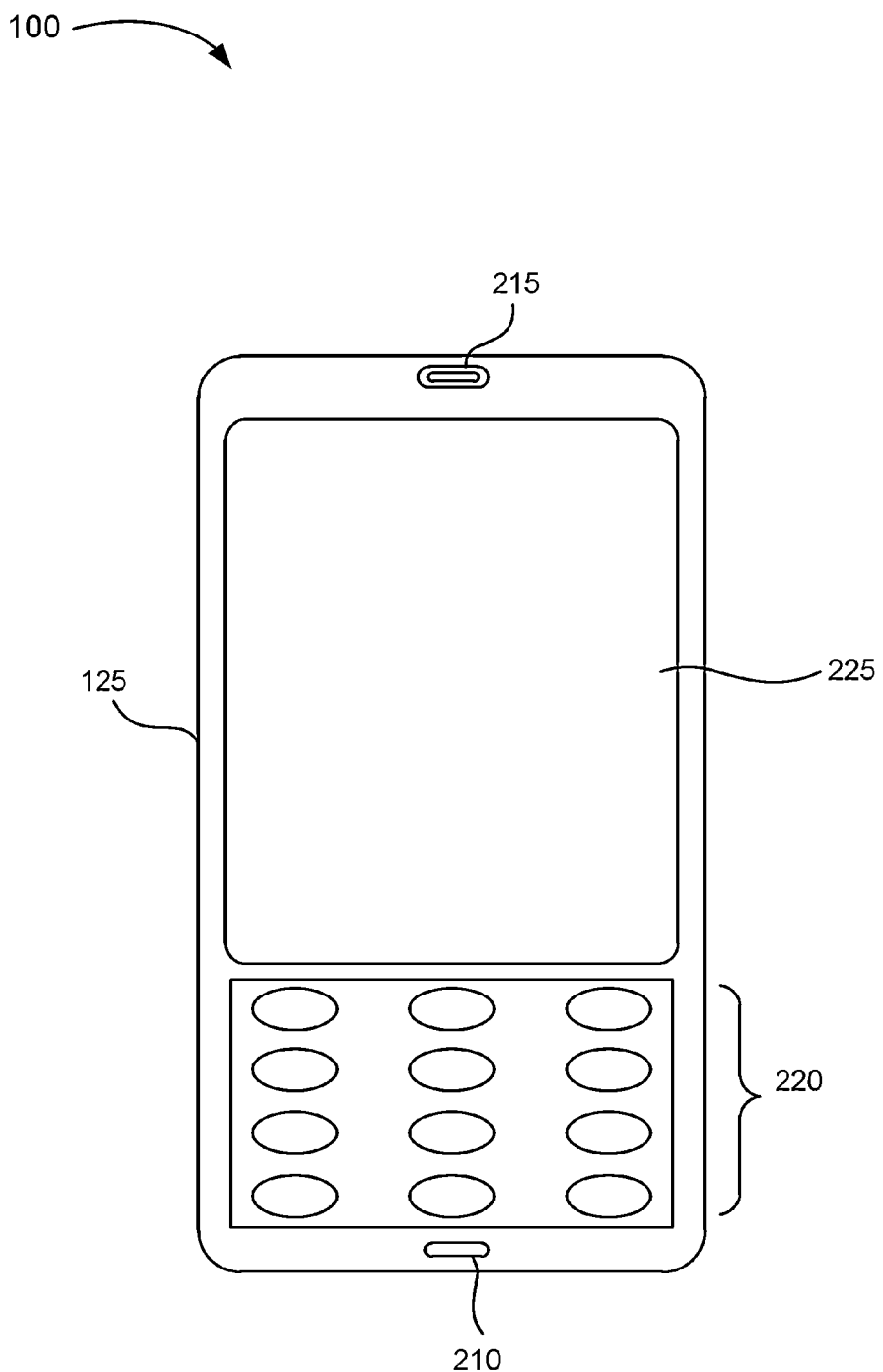
FIG. 2 is a diagram illustrating an exemplary user device in which an exemplary embodiment described herein may be implemented.

FIG. 2 is a diagram illustrating an exemplary user device 100 in which exemplary embodiments described herein may be implemented. The term "user device," as used herein, is intended to be broadly interpreted to comprise a variety of devices. User device 100 may correspond to a portable device, a mobile device, a tablet device, a stationary device, or a handheld device. For example, user device 100 may take the form of a telephone (e.g., a smart phone, a radio phone, a cellular phone, a wireless phone, etc.), a personal digital assistant (PDA), a data organizer, a calculator, a picture capturing device, a video capturing device, a Web-access device, a music playing device, a location-aware device, a gaming device, a computer, and/or some other type of user device.

As illustrated in FIG. 2, user device 100 may comprise a housing 125, a microphone 210, speakers 215, keys 220, and a touch display 225. According to other embodiments, user device 100 may comprise fewer components, additional components, different components, and/or a different arrangement of components than those illustrated in FIG. 2 and described herein. Additionally, or alternatively, although user device 100 is depicted as having a portrait configuration, according to other embodiments, user device 100 may have a landscape configuration or some other type of configuration (e.g., a clamshell configuration, a slider configuration, a candy bar configuration, a swivel configuration, etc.).

Housing 125 has been previously described. Housing 125 may structurally support microphone 210, speakers 215, keys 220, and touch display 225.

Microphone 210 may include one or multiple microphones that comprise microphone 130. A user may speak into microphone 210 during a telephone call, to execute a voice command, to execute a voice-to-text conversion, etc. Speakers 215 may transduce an electrical signal to a corresponding sound wave. For example, a user may listen to music, to a calling party, etc., through speakers 215.

Keys 220 may provide input to user device 100. For example, keys 220 may comprise a standard telephone keypad, a QWERTY keypad, and/or some other type of keypad (e.g., a calculator keypad, a numerical keypad, etc.). Keys 220 may also comprise special purpose keys to provide a particular function (e.g., send a message, place a call, open an application, etc.) and/or allow a user to select and/or navigate through user interfaces or other content displayed by touch display 225. According to an exemplary embodiment, one or more keys 220 may comprise fluorescently-painted symbol(s) and/or three-dimensional fluorescent symbol(s). For example, one or more keys 220 may be illuminated using fluorescently-painted symbols and/or three-dimensional symbols, as described herein.

Touch display 225 may comprise front window 115 and display 110, as previously described. Touch display 225 may be capable of displaying various images (e.g., icons, objects, etc.) that may be selected by a user to access various applications, enter data, navigate through user interfaces, etc. According to an exemplary embodiment, touch display 225 may provide on-touch and, air-touch and/or air-gesture capabilities.

FIG. 3 is a diagram illustrating exemplary components of user device 100. As illustrated, user device 100 may comprise a bus 305, a processing system 310, memory/storage 315 that may comprise applications 320, a communication interface 325, an input 330, and an output 335. According to other embodiments, user device 100 may comprise fewer components, additional components, different components, and/or a different arrangement of components than those illustrated in FIG. 3 and described herein.

Bus 305 may comprise a path that permits communication among the components of user device 100. For example, bus 305 may include a system bus, an address bus, a data bus, and/or a control bus. Bus 305 may also include bus drivers, bus arbiters, bus interfaces, and/or clocks.

Processing system 310 may include one or multiple processors, microprocessors, data processors, co-processors, application specific integrated circuits (ASICs), system-on-chips (SOCs), application specific instruction-set processors (ASIPs), controllers, programmable logic devices (PLDs), chipsets, field programmable gate arrays (FPGAs), and/or some other processing logic that may interpret and/or execute instructions and/or data. Processing system 310 may control the overall operation, or a portion of operation(s) performed by user device 100. Processing system 310 may perform operations based on an operating system and/or various applications (e.g., applications 320). Processing system 310 may access instructions from memory/storage 315, from other components of user device 100, and/or from a source external to user device 100 (e.g., another device or a network).

Memory/storage 315 may comprise one or multiple memories and/or one or multiple other types of tangible storage mediums. For example, memory/storage 315 may comprise one or more types of memories, such as, a random access memory (RAM), a dynamic random access memory (DRAM), a cache, a static random access memory (SRAM), a read only memory (ROM), a programmable read only memory (PROM), a ferroelectric random access memory (FRAM), an erasable programmable read only memory (EPROM), s static random access memory (SRAM), a flash memory, and/or some other form of hardware for storing. Memory/storage 315 may comprise a hard disk (e.g., a magnetic disk, an optical disk, a magneto-optic disk, a solid state disk, etc.) and a corresponding drive. Memory/storage 315 may be external to and/or removable from user device 100, such as, for example, a Universal Serial Bus (USB) memory, a dongle, etc.

Memory/storage 315 may store data, applications 320, and/or instructions related to the operation of user device 100. Applications 320 may comprise software or program(s) that provides various services or functions. By way of example, applications 320 may comprise a telephone application, a voice recognition application, a video application, a multimedia application, a music playing application, a texting application, an instant messaging application, etc. According to an exemplary embodiment, applications 320 may comprise a finger state handler application, as described further below.

Communication interface 325 may permit user device 100 to communicate with other devices, networks, and/or systems. For example, communication interface 325 may comprise one or multiple wireless and/or wired communication interfaces. Communication interface 325 may comprise a transmitter and a receiver, or a transceiver. Communication interface 325 may operate according to one or multiple protocols, communication standards, or the like.

Input 330 may permit an input into user device 100. For example, input 330 may comprise a keyboard, a keypad (e.g., keypad 220), a touch panel (e.g., touch display 225), a touch pad, a mouse, a port, a button, a switch, a microphone (e.g., microphone 210, microphone 130), voice recognition logic, an input port, a knob, and/or some other type of input component (e.g., a light sensor). Output 335 may permit user device 100 to provide an output. For example, output 335 may include a display (e.g., touch display 225), a speaker (e.g., speakers 215), a light emitting diode (LED), an output port, a vibratory mechanism, or some other type of output component.

User device 100 may perform operations or processes in response to processing system 310 executing instructions (e.g., software, a program, etc.) stored by memory/storage 315. For example, the instructions may be read into memory/storage 315 from another storing medium or from another device via communication interface 325. The instructions stored by memory/storage 315 may cause processing system 310 to perform various operations or processes. Alternatively, user device 100 may perform processes based on the execution of hardware, hardware and firmware, and/or hardware, software, and firmware.

As previously described, according to an exemplary embodiment, the finger-on and finger-off detection capabilities may be implemented based on one or more types of sensors that detect sound waves actuated when the user touches the touch display (e.g., touch display 225) with his/her finger(s) or an instrument. A further description is provided below.

Figure 4A:
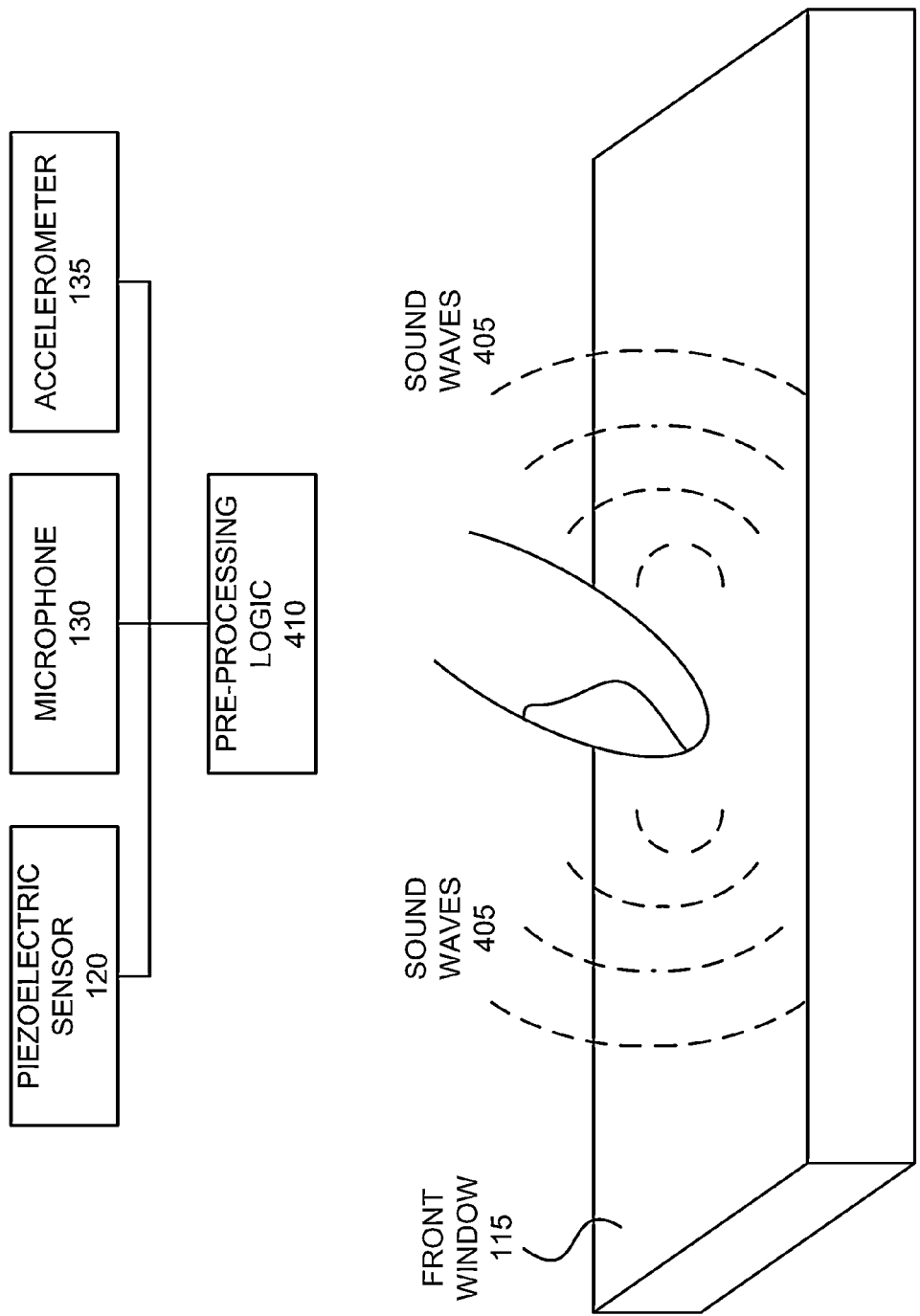
FIG. 4A is a diagram illustrating an exemplary process for detecting when a user touches a touch display.

FIG. 4A is a diagram illustrating an exemplary process for detecting when a user touches front window 115. As illustrated, when the user touches front window 115, sound waves 405 are produced. According to an exemplary embodiment, piezoelectric sensor(s) 120, microphone(s) 130, and/or accelerometer(s) 135 may detect sound waves 405. The detected sound waves 405 may cause piezoelectric sensor(s) 120, microphone(s) 130, and/or accelerometer(s) 135 to produce signal(s) that may be sent to a pre-processing logic 410. Pre-processing logic 410 may determine whether the signal corresponds to a touching of front window 115. The operations performed by pre-processing logic 410 may depend on the type of sensor (i.e., piezoelectric sensor 120, microphone 130, and accelerometer 135). For example, as previously described and with reference to piezoelectric sensor 120, pre-processing logic 410 may read and filter values (e.g., analog values, digital values, voltages, etc.) output from piezoelectric sensor or intermediary components (e.g., an analog-to-digital converter, etc.). Pre-processing logic 410 may use voltage signal signature(s) or voltage threshold(s) stored by user device 110 for comparison. Additionally, for example, with reference to microphone 130, pre-processing logic 410 may identify frequency/amplitude signature over time of the signal output from microphone 130, which may be compared to frequency/amplitude signatures stored by user device 100. Other types of processing may be performed (e.g., analog-to digital conversion, filtering, etc.) to obtain values for comparison. When microphone 130 is also used to receive a user's speech, etc., the output of microphone 130 may require sending the signal through additional processing paths since the normal audio path may not permit user device 100 to identify whether the sound wave corresponds to when a user's finger(s) or an instrument touches the surface of touch display 225. Additionally, for example, with reference to accelerometer 135, pre-processing logic 410 may identify vibration patterns or accelerations indicative of when front window 115 is touched (e.g., the propagation of the sound wave through material proximate to accelerometer 135).

Figure 5:
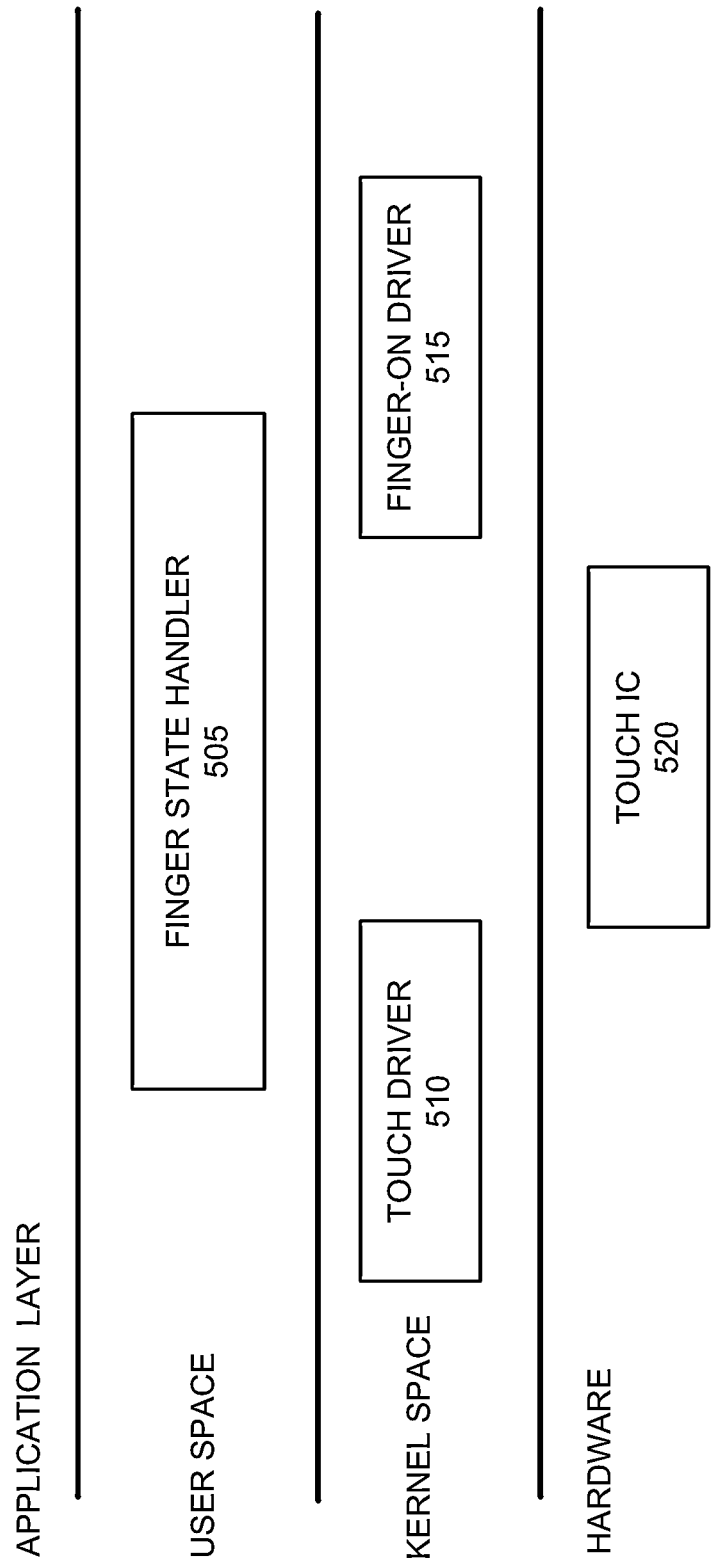
FIG. 5 is a diagram illustrating an exemplary finger-state handler and an exemplary finger-on driver.

Referring to FIG. 5, when pre-processing logic 410 determines that a touch event occurred, a signal may be sent to a finger state handler 505. According to an exemplary embodiment, finger state handler 505 may be implemented as a daemon application that runs in the background and manages the level of sensitivity of touch display 225 via a touch driver 510 and a finger-on driver 515. Finger-on driver 515 may manage the sensitivity of touch display 225 to a decreased level for accommodating on-touch of touch display 225. Touch driver 510 may manage the sensitivity of touch display 225 to an increased level for accommodating air-touch and air-gesture capabilities. Touch integrated circuit (IC) 520 is the touch-sensitivity hardware of touch display 225.

According to an exemplary process, upon receipt of the signal from pre-processing logic 410 indicating an on-touch event, finger state handler 505 may set finger-on driver 515 to a decreased sensitivity mode (e.g., lowering the threshold for detecting a signal that indicates on-touch).

The absence of a finger or an instrument touching touch display 225 may be detected by the touch sensors of touch display 225. According to an exemplary process, finger state handler 505 may receive a signal from, for example, touch driver 510 indicating the finger-off event (e.g., when the user lifts his/her finger or the instrument off of front window 115). According to an exemplary implementation, touch display 225 may remain in the decreased sensitivity mode when the finger(s) or instrument is/are lifted off of touch display 225. According to another implementation, touch display 225 may be set to a default sensitivity mode, which may be either the decreased sensitivity mode or the increased sensitivity mode. According to an exemplary implementation, a timer may be used in which after a particular period of time transpires, without receiving a touch from a user, touch display 225 is set to the increased sensitivity mode.

Although pre-processing logic 410 is illustrated as a separate component from finger state handler 505, according to an exemplary embodiment, pre-processing logic 410 and finger state handler 505 may be combined.

Figure 4B:
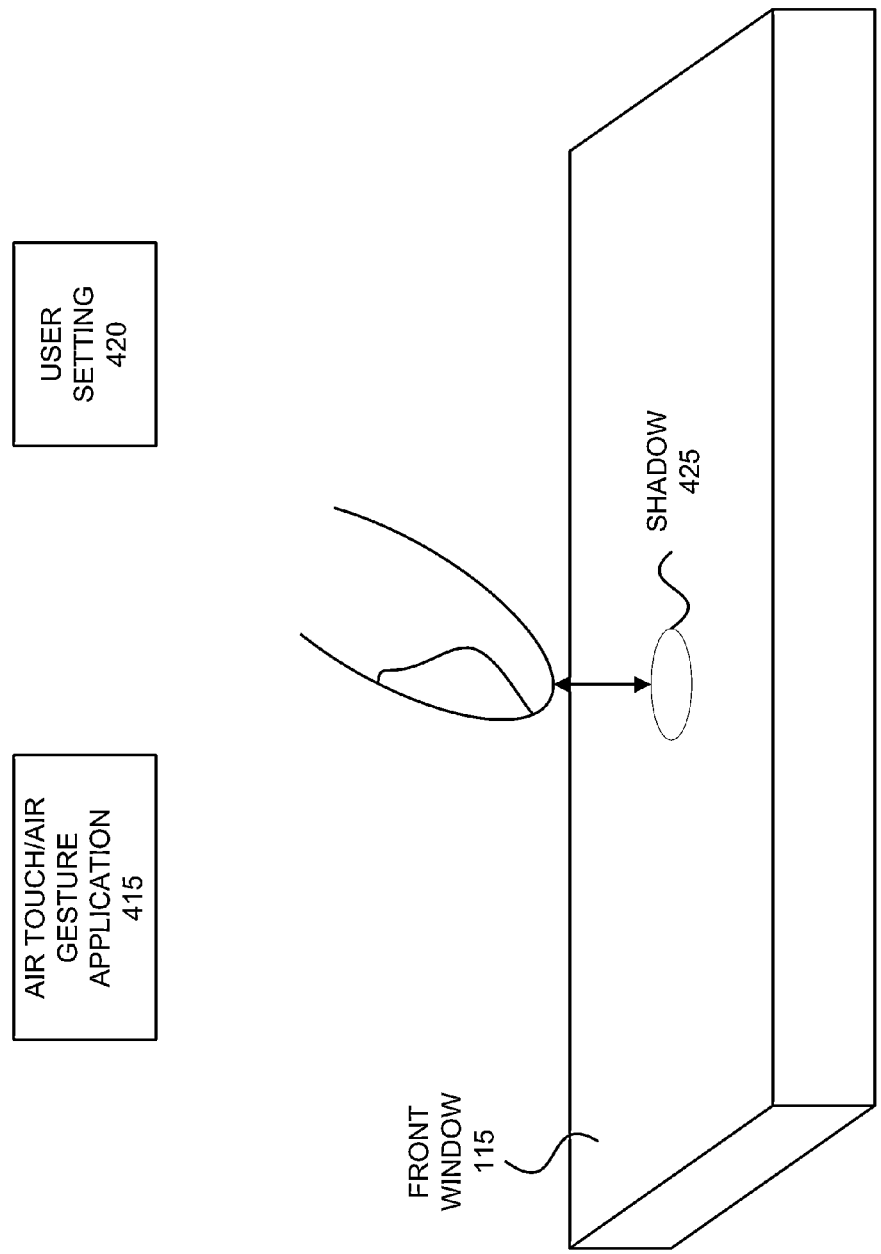
FIG. 4B is a diagram illustrating an exemplary process for identifying when a user intends not to touch a touch display.

FIG. 4B is a diagram illustrating an exemplary process for identifying when a user intends to not touch front window 115. For example, the user may wish to operate in air-touch/air-gesture mode. According to an exemplary embodiment, the user may launch an air-touch/air gesture application 415 that provides for air-touch/air gesture input. According to another embodiment, the user may configure user device 100 for air-touch/air gesture operation via a user setting 420. According to another embodiment, air-touch/air gesture operation may be actuated based on a shadow tracer included in a user interface application that detects a shadow 415 produced by a user's finger(s) or an instrument being in proximity to front window 115. The shadow tracer may identify where an air-touch is located relative to front window 115. The shadow tracer may also identify the relative shape of shadow 415 to determine whether the shape corresponds to the user's finger or an instrument.

According to an exemplary embodiment, the identifying described above may trigger finger state handler 505 to set touch driver 510 to an increased sensitivity mode. For example, the detection may be based on when the user launches air-touch/air-gesture application 415, user setting 420, the detection of shadow 415, or touch driver 510 indicating a finger-off event.

Figure 6:
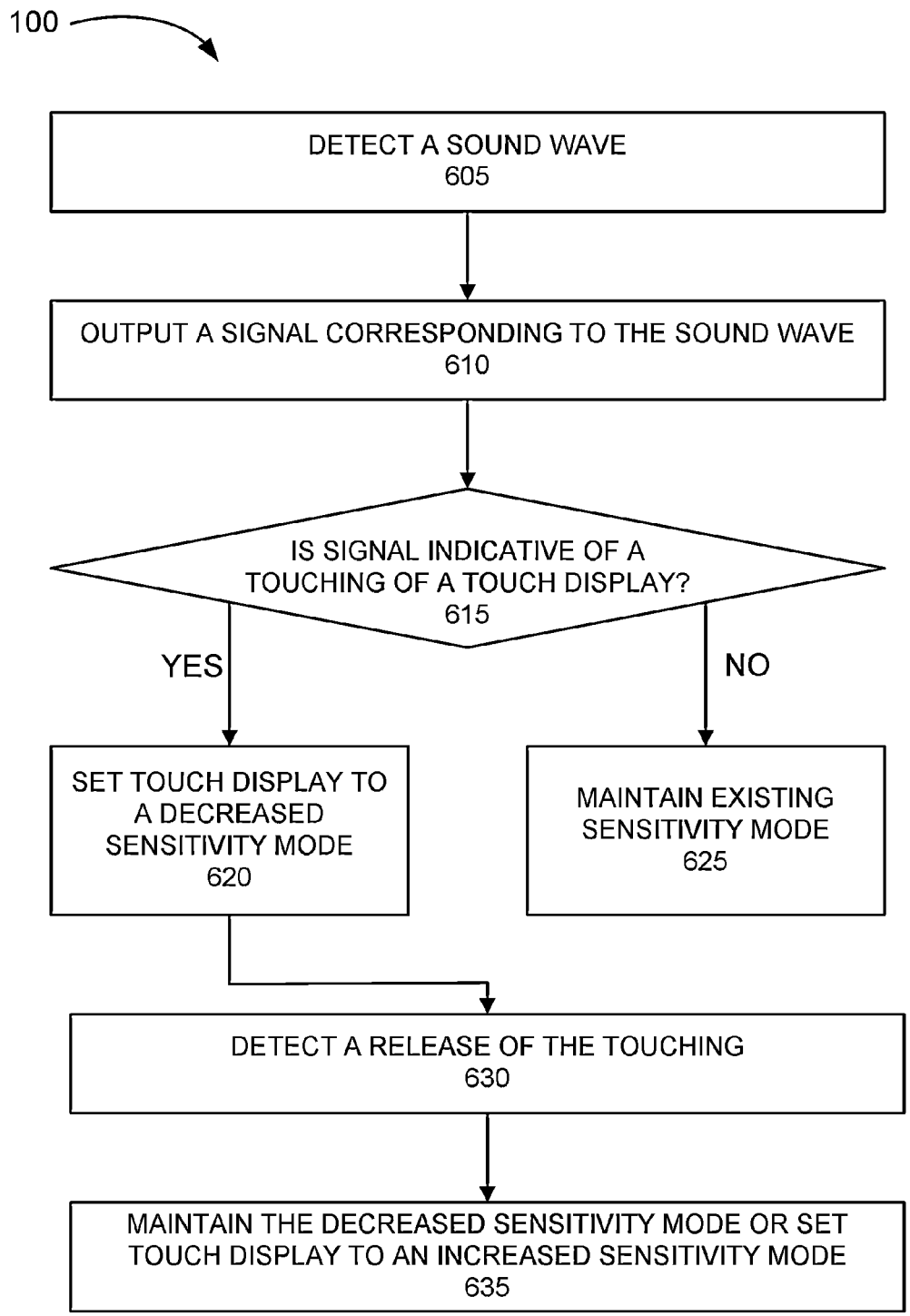
FIG. 6 is a flow diagram illustrating an exemplary process for finger-on and finger-off detections.

FIG. 6 is a flow diagram illustrating an exemplary process 600 for finger-on and finger-off detection. Process 600 is performed by various components of user device 100, as described herein.

In block 605, a sound wave (e.g., a pressure wave including compressions and rarefactions) is detected. For example, the wave is detected via a sensor, such as, piezoelectric sensor 120, microphone 130, and/or accelerometer 125 of user device 100. The sound wave may propagate through various mediums (e.g., air, materials of user device 100). In block 610, a signal corresponding to the detected sound wave is output by the sensor. For example, a voltage signal, an analog signal, or a digital signal may be output. The outputted signal is sent to pre-processing logic 410. In block 615, it is determined whether the outputted signal is indicative of a touching of touch display 225. Pre-processing logic 410 may process the outputted signal to determine whether the outputted signal is indicative of the touching of touch display 225. For example, as previously described, the processing may include comparing the signature of the signal to other signatures known to be indicative of touching (e.g., by a user's finger or an instrument), filtering, etc.

If it is determined that the signal is indicative of the touching of touch display 225 (block 615—YES), touch display 225 is set to a decreased sensitivity mode (block 620). For example, pre-processing logic 410 indicates to finger state handler 505 the finger-on event. Finger state handler 505 sets the sensitivity of touch display 225 via finger-on driver 515.

If it is determined that the signal is not indicative of a touching of touch display 225 (block 615—NO), then the sensitivity mode remains the same (block 625). Thus, the sensitivity mode is either in the decreased sensitivity mode or the increased sensitivity mode. In block 630, the release of the touching is detected. For example, the touch sensors associated with touch display 225 detect the lifting-off of the user's finger or instrument. In block 635, the sensitivity mode of touch display 225 remains the same or is set to an increased sensitivity mode (e.g., for air-touch/air-gesture). For example, the touch sensors signal touch driver 510 to indicate the finger-off event and touch driver 510 provides this information to finger state handler 505. Depending on the embodiment of user device 100, finger state handler 505 will keep touch display 225 in a decreased sensitivity mode or set touch display 225 to an increased sensitivity mode via touch driver 510.

Although FIG. 6 illustrates an exemplary process 600, according to other embodiments, process 600 may include additional operations, fewer operations, and/or different operations than those illustrated in FIG. 6 and described.

For example, in some implementations, rather than relying on sound saves to detect whether a user's finger has touched the display, user device 100 may determine that the user's finger has touched the display by applying a high threshold on capacitive or field sensor on display. When the user's finger actually touches the display, the capacitive/field strength may change significantly, exceeding the high threshold.

The foregoing description of embodiments provides illustration, but is not intended to be exhaustive or to limit implementations to the precise form disclosed. Modifications and variations of the embodiments and/or implementations are possible in light of the above teachings, or may be acquired from practice of the teachings.

The flowchart and blocks illustrated and described with respect to FIG. 6 illustrates an exemplary process according to an exemplary embodiment. However, according to other embodiments, the function(s) or act(s) described with respect to a block or block(s) may be performed in an order that is different than the order illustrated and described. For example, two or more blocks may be performed concurrently, substantially concurrently, or in reverse order, depending on, among other things, dependency of a block to another block.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

Spatially relative terms, such as, for example, "top," "bottom," "beneath," "upward," "up," "downward," and the like, may be used for ease of description to describe one element's relationship to another element or to describe one feature's relationship to another feature, as may be illustrated in the figures and/or described. Spatially relative terms are intended to encompass different orientations of the user device in use, operation, or configuration, in addition to the use, the operation, or the configuration illustrated in the figures and/or described. For example, if the user device illustrated in a figure is turned over or oriented differently than an orientation illustrated (e.g., rotated at 90 degrees or some other rotation, etc.), the spatially relative terms used herein should be interpreted accordingly.

The term "logic" or "component," when used in the specification may include hardware (e.g., processing system 310), a combination of hardware and software (applications 320), a combination of hardware, software, and firmware, or a combination of hardware and firmware. The terms "a," "an," and "the" are intended to be interpreted to include both the singular and plural forms, unless the context clearly indicates otherwise. Further, the phrase "based on" is intended to be interpreted to mean, for example, "based, at least in part, on," unless explicitly stated otherwise. The term "and/or" is intended to be interpreted to include any and all combinations of one or more of the associated list items.

In the specification and illustrated by the drawings, reference is made to "an exemplary embodiment," "an embodiment," "embodiments," etc., which may include a particular feature, structure or characteristic in connection with an embodiment(s). However, the user of these terms or phrases does not necessarily refer to all embodiments described, nor does it necessarily refer to the same embodiment, nor are separate or alternative embodiments necessarily mutually exclusive of other embodiment(s). The same applies to the term "implementation," "implementations," etc.

The term "computer-readable medium," as used herein is intended to include a tangible storage medium, such as memory/storage 315. Embodiments may take the form of an entirely software embodiment (e.g., including firmware, resident software, micro-code, etc.). Alternatively, embodiments may take the form of a combination of software and hardware (e.g., a circuit, a module, a system, etc.). Furthermore, embodiments may take the form of a computer program product embodied on a tangible computer-readable medium.

No element, act, or instruction disclosed in the specification should be construed as critical or essential to the embodiments described herein unless explicitly described as such.

What is claimed is:

1. A user device comprising:
   a touch display operable in an on-touch mode or a touchless mode by a user, wherein the touch display comprises a driver;
   one or more sensors to detect a sound wave produced when a user's finger or an instrument touches the touch display;
   one or more memories to store instructions; and
   one or more processing systems to execute the instructions and configure the one or more processing systems to:
      identify whether a detected sound wave includes characteristics indicative of when the user's finger or the instrument touches the touch display, wherein the characteristics include frequency and amplitude; and
      set a sensitivity mode of the driver of the touch display to a decreased level for the on-touch mode based on an identification that the detected sound wave includes the characteristics indicative of when the user's finger or the instrument touches the touch display, wherein the decreased level is relative to an increased level for the touchless mode of the touch display.

2. The user device of claim 1, wherein the one or more sensors comprise at least one of a microphone or an accelerometer, and wherein the driver comprises:
   a first driver that manages a sensitivity of the touch display for the touchless mode; and
   a second driver that manages a sensitivity of the touch display for the on-touch mode.

3. The user device of claim 2, wherein the microphone is also used to receive voice, from the user, during a telephone call.

4. The user device of claim 1, wherein the one or more sensors comprise one or more microphones, and when the identification whether the detected sound wave includes characteristics indicative of when the user's finger or the instrument touches the touch display, the one or more processing systems execute the instructions and configure the one or more processing systems to:
   compare one or more signals output from the one or more microphones to a frequency signature and an amplitude signature representing when a user's finger or an instrument touches the touch display.

5. The user device of claim 1, wherein the one or more sensors comprise one or more piezoelectric sensors, and when identifying whether the detected sound wave includes characteristics indicative of when the user's finger or the instrument touches the touch display, the one or more processing systems execute the instructions and configure the one or more processing systems to:
   compare one or more signals output from the one or more piezoelectric sensors to a voltage signature representing when a user's finger or an instrument touches the touch display.

6. The user device of claim 1, wherein the touch display is a single-point input device.

7. The user device of claim 1, wherein the user device comprises a mobile communication device, and wherein the one or more processing systems execute the instructions and configure the one or more processing systems to:
   use a timer to determine a period of time in which the touch display does not receive a touch from the user; and set the driver of the touch display from the decreased level to the increased level based on a transpiration of the period of time.

8. The user device of claim 1, wherein the one or more sensors comprise one or more accelerometers that identify a vibration pattern or an acceleration indicative of when the user's finger or the instrument touches the touch display, and wherein the one or more processing systems execute the instructions and configure the one or more processing systems to:
set the sensitivity mode of the driver of the touch display to the decreased level based on an identification of the vibration pattern or the acceleration by the one or more accelerometers.

9. A method comprising:
detecting a sound wave;
outputting a signal corresponding to the sound wave;
determining whether the signal is indicative of a user's finger or an instrument touching a surface of a touch display based on characteristics of the signal, wherein the characteristics include frequency and amplitude;
setting a sensitivity level of a driver of the display to a decreased level for on-touch operation of the touch display relative to an increased level for touchless operation of the touch display, based on determining that the signal is indicative of the user's finger or the instrument touching the surface of the touch display;
subsequently detecting a release of the user's finger or the instrument from the surface of the touch display; and
setting a sensitivity level of the driver of the touch display to the increased level.

10. The method of claim 9, wherein the determining comprises:
comparing the signal to a frequency and amplitude spectral signature over time representative of when a user's finger or an instrument touches the surface of the touch display; and
determining whether a match exists based on the comparing.

11. The method of claim 9, further comprising:
maintaining the increased level of sensitivity of the driver of the touch display based on determining that the signal is not indicative of the user's finger or the instrument touching the surface of the touch display.

12. The method of claim 9, wherein the detecting is based on one or more microphones or one or more accelerometers.

13. The method of claim 9, wherein the sound wave is detected when it propagates via the touch display.

14. The method of claim 9, further comprising:
receiving a request to launch an air-touch and air-gesture application or a user setting; and
setting the sensitivity level of the driver of the touch display to the increased level based on the receiving.

15. The method of claim 9, wherein the detecting is based on one or more piezoelectric sensors, and wherein the outputting comprises:
outputting a voltage signal corresponding to the sound wave.

16. The method of claim 9, further comprising:
detecting a shadow located on the touch display;
determining whether a shape of the shadow corresponds to any of the user's finger or the instrument; and
providing a touchless input based on determining that the shape of the shadow corresponds to the user's finger or the instrument.

17. A non-transitory, computer-readable medium storing instructions, executable by one or more processors of a device, for:
receiving a signal based on a detection of a sound wave;
determining whether characteristics of the signal are indicative of a user's finger or an instrument touching a surface of a touch display, wherein the characteristics include frequency and amplitude;
setting a sensitivity level of a driver of the touch display to a decreased level for on-touch operation of the touch display based on determining that the characteristics of the signal are indicative of the user's finger or the instrument touching the surface of the touch display, wherein the decreased level is relative to an increased level for touchless operation of the touch display;
subsequently detecting a release of the user's finger or the instrument from the surface of the touch display; and
setting a sensitivity level of the driver of the touch display to the increased level or maintaining the decreased level.

18. The non-transitory, computer-readable medium of claim 17, further storing instructions for:
comparing the signal to a frequency and amplitude spectral signature over time representative of when a user's finger or an instrument touches the surface of the touch display; and
determining whether a match exists based on the comparing.

19. The non-transitory, computer-readable medium of claim 17, further storing instructions for:
maintaining the setting level of the driver of the touch display based on determining that the signal is not indicative of the user's finger or the instrument touching the surface of the touch display.

20. The non-transitory, computer-readable medium of claim 17, further storing instructions for:
comparing the signal to a voltage signal signature representative of when a user's finger or an instrument touches the surface of the touch display; and
determining whether a match exists based on the comparing.

* * * * *